United States Patent [19]
Friedman et al.

[11] Patent Number: 5,815,316
[45] Date of Patent: Sep. 29, 1998

[54] PROTECTION SYSTEM AND TECHNIQUE FOR ELECTRO-OPTICAL SYSTEMS

[75] Inventors: Melvin H. Friedman, Alexandria; Lesley R. Condiff, Woodbridge, both of Va.

[73] Assignee: The United States of America as represented by the Secretary of the Army, Washington, D.C.

[21] Appl. No.: 921,367

[22] Filed: Aug. 29, 1997

[51] Int. Cl.$^6$ ................................................ G03B 11/04
[52] U.S. Cl. ........................................ 359/511; 359/600
[58] Field of Search ................................. 359/227–228, 359/353, 388, 511–513, 507, 600, 611, 819; 396/90, 448; 33/241–252

[56] References Cited

U.S. PATENT DOCUMENTS

| | | | |
|---|---|---|---|
| 4,441,799 | 4/1984 | Enomoto | 396/448 |
| 5,408,359 | 4/1995 | Ferrett et al. | 359/600 |
| 5,525,970 | 6/1996 | Friedman et al. | 250/203.2 |
| 5,661,598 | 8/1997 | Tomioka | 359/385 |

FOREIGN PATENT DOCUMENTS

| 43 133 | 1/1982 | European Pat. Off. | 359/385 |
|---|---|---|---|

*Primary Examiner*—Thong Nguyen
*Attorney, Agent, or Firm*—Milton W. Lee; John E. Holford; Alain L. Bashore

[57] ABSTRACT

A protection system and technique for a set adjustable brightness control level regardless of previous deactivation of system display component in a thermal weapon sight (TWS) when a lens cap is utilized for covering optics of the TWS.

2 Claims, 3 Drawing Sheets

PROTECTION SYSTEM AND TECHNIQUE FOR ELECTRO-OPTICAL SYSTEMS

RELATED APPLICATION

This is a substitute application for patent application Ser. No. 08/307,207 filed 16 Sep. 1994, now abandoned.

BACKGROUND OF THE INVENTION

1. Field of the Invention

The present invention generally relates to a protection system and technique for electro-optical systems and more specifically, to a protection system and technique for protecting against continued operation of system components after system use is no longer required.

2. Description of Prior Art

In a typical electro-optical system a lens cap protects the lens and power switches are used to apply power when the equipment is in use and is turned off when the equipment is not in use to both save power and extend the life of electrical components.

The presently fielded Thermal Weapon Sight (TWS) model AN/PAS-13 is one Prior Art system which utilizes the above technique. To use the TWS, the operator goes through the following steps:

a. Take off lens cap;
b. Turn the power switch to the "on" position and allow the detector array to cool down; and
c. Adjust the brightness control.

The following steps are followed when the operator no longer needs to use the system:

a. Turn the power switch to the "off" position; and
b. Put the lens cap back on the system.

While the above steps are understandable and are typical of almost all electro-optical systems, the practicality on the battlefield can be restricted. Under the pressure of battle the operator may initially forget to take off the lens cap resulting in a valuable loss of time spent figuring out why the system is not working properly. The operator may remember to take the lens cap off and forget to turn the power switch on and loose valuable time figuring out why the system is not working properly. Even if the operator remembers to take off the lens cap and turn on the power, valuable time is spent readjusting the brightness control, since the brightness control is also the on/off switch and while the system is cooling down the operator may set the brightness control inappropriately.

For virtually every electro-optical system it is appropriate to turn power to "on" when the lens cap is taken off and to turn power "off" when the lens cap is put back on. While the prior art has reported using electro-optical systems none have established a basis for a specific apparatus that is dedicated to the task of resolving the particular problem at hand. What is needed in this instance is a safety system and technique for protecting against continued operation of electro-optical system functions after system use is no longer required.

SUMMARY OF THE INVENTION

It is therefore one object of the invention to provide a safety system and technique for protecting against continued operation of electro-optical system functions after system use is no longer required.

According to the invention, there is disclosed a safety system and technique for deactivation of system functions of an electro-optical system when a lens cap is covering system optics. A power source produces power to system functions and system optics assist in the viewing of a scene. System functions utilize power from the power source for correct operation of the system. A lens cap and microswitch provides power activation and substantially simultaneous uncovering of system optics. When the system optics is uncovered the system function is activated, and when the system optics is covered by the lens cap the system function is deactivated.

The present invention is utilized on the telescope assembly of the presently fielded Thermal Weapons Sight. A lens cap pivots about and is designed to closed and open about the barrel end of the telescope assembly so as to cover IR optics located within the lens barrel and sufficient to keep a micro-switch actuator depressed. The operator removes the lens cap and in the act of doing this applies electrical power to every component of TWS that needs power i.e. the signal processor, detector, scanner, and thermal cooler.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
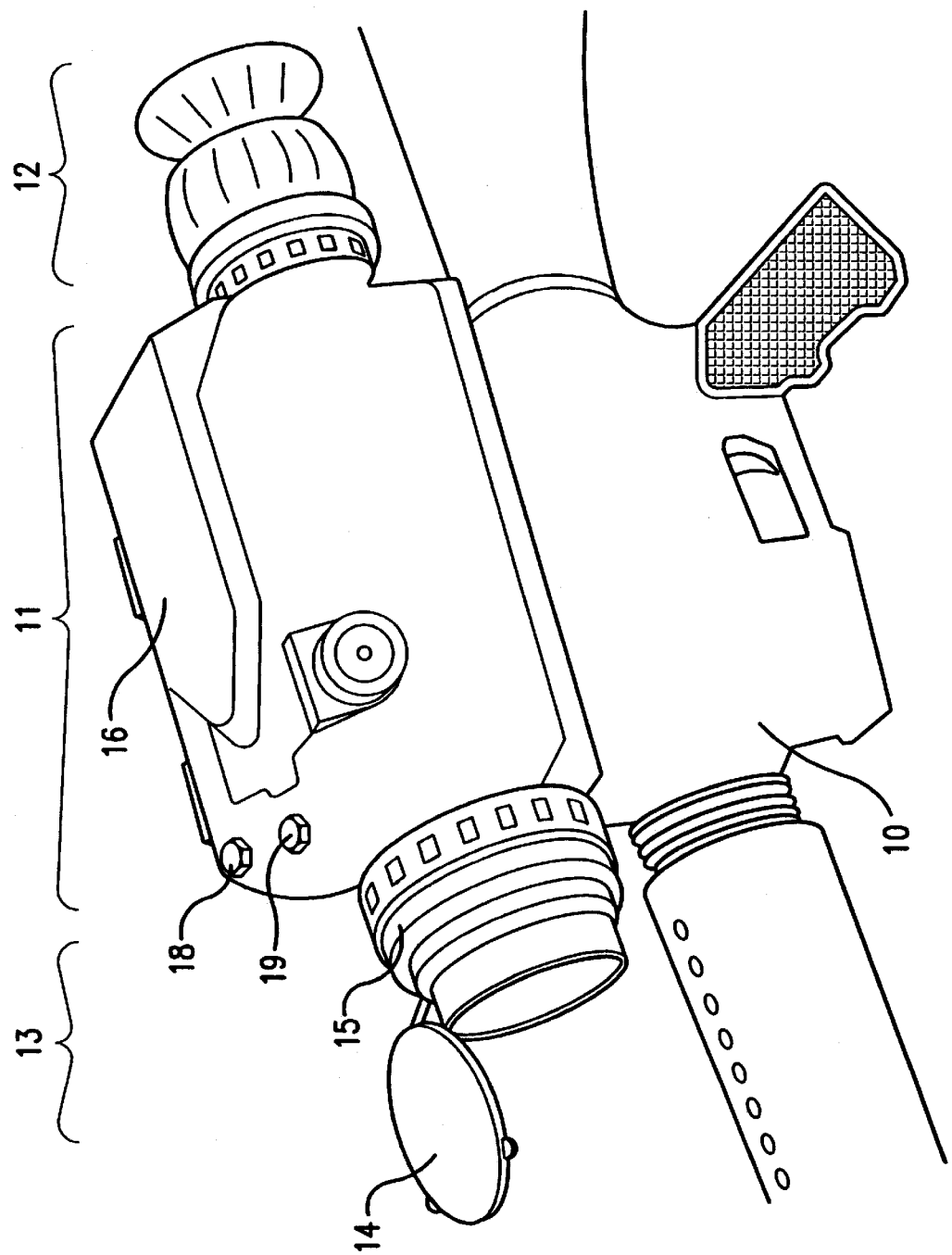
FIG. 1 is a profile view of the prior art Thermal Weapons Sight (TWS) coupled to a weapon.

Referring now to the drawings, and more particularly to FIG. 1, there is shown a profile view of the currently fielded Thermal Weapons Sight (TWS) model AN/PAS-13 coupled to weapon 10. The TWS is the first 3–5 micron spectral band sensor light which is enough to mount on a hand held rifle, and gives the user an ability to acquire targets during the day and night through both natural and man-made obscurants. The basic sensor is a sealed unit, which includes a main housing body assembly 11, eyepiece assembly 12 and telescope assembly 13. The telescope assemblies may be replaced without the need for system re-purging. This modular approach provides for sensor acquisition range performance matched to that of supported weapon systems.

To use the currently fielded system under battlefield conditions, the user flips objective lens cover 14 to the open position, turns the knob 18 which is a combination on/off and brightness switch to apply power to the unit, waits for the system to cool down and then further adjusts knob 18 to get an optimal brightness. With the brightness selected by knob 18, it may be necessary to adjust the contrast and this is done with knob 19. In general knobs 18 and 19 are adjusted to get an optimal brightness and contrast for the scene. Some features of the system are best utilized before a battle. Door 16 is provided to allow the user to change the batteries. A-focal telescope 15 may be removed and replaced with either of two other a-focal telescopes to control the magnification as is appropriate for weapons with different ranges.

Figure 2:
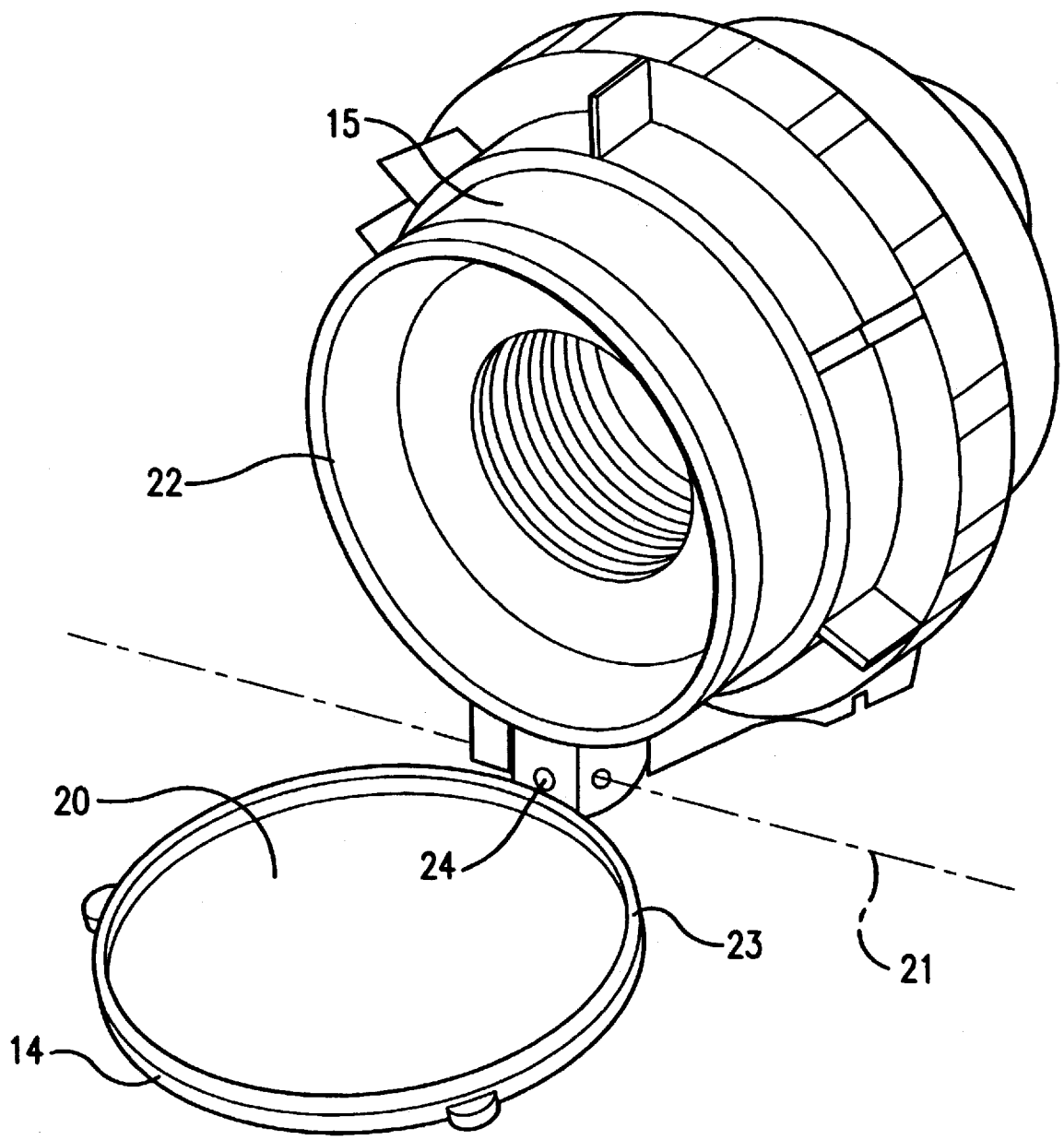
FIG. 2 is a profile view of a TWS telescope assembly utilizing the present invention.

FIG. 2 is a profile view of the TWS telescope assembly utilizing for the TWS shown in FIG. 1. Lens cap 14 of FIG. 2, which includes inner annular area 20, pivots about axis 21 and is designed closed and open about barrel end 22 so as to cover IR optics located within the lens barrel of FIG. 2. Inner annual sleeve 23 slidingly engages with the outer barrel end surface so that an appropriate snug fit is obtained whereby the lens is protected. The diameter of inner annular sleeve 23 is dimensioned so as to make a snug fit on lens barrel 22 and sufficient to keep a micro-switch actuator depressed. The outer diameter of lens cap 20 is dimensioned so as to be large enough to depress micro-switch button actuator 24.

Micro switch 24 can be positioned so that it is actuated by the lip of lens cover 20 or it can be positioned so that it is actuated by rotational movements about axis 21. The actuating force should not be so light that accelerations caused by firing the weapon would cause the micro-switch to close. However, the actuating force should be light enough so that snugness of the lens cap (assisted by the spring which keeps the lens cap in one of two positions) on the barrel 22 will keep the micro-switch actuator depressed. Pretravel distance of the actuator movement, defined as the distance the actuator moves before the micro-switch changes state, should not be so small that the accelerations caused by firing the weapon would cause the micro-switch to change state when the weapon is fired. However, the pretravel distance of the actuator movement must not be too large as the depth of the inner annual sleeve, shown in FIG. 2 must exceed the pretravel distance. The total travel distance of the actuator movement, defined as the maximum distance the micro-switch actuator can be depressed, must exceed the depth of the inner annular sleeve. The micro-switch can be located anywhere on the outer surface of barrel 22.

Figure 3:
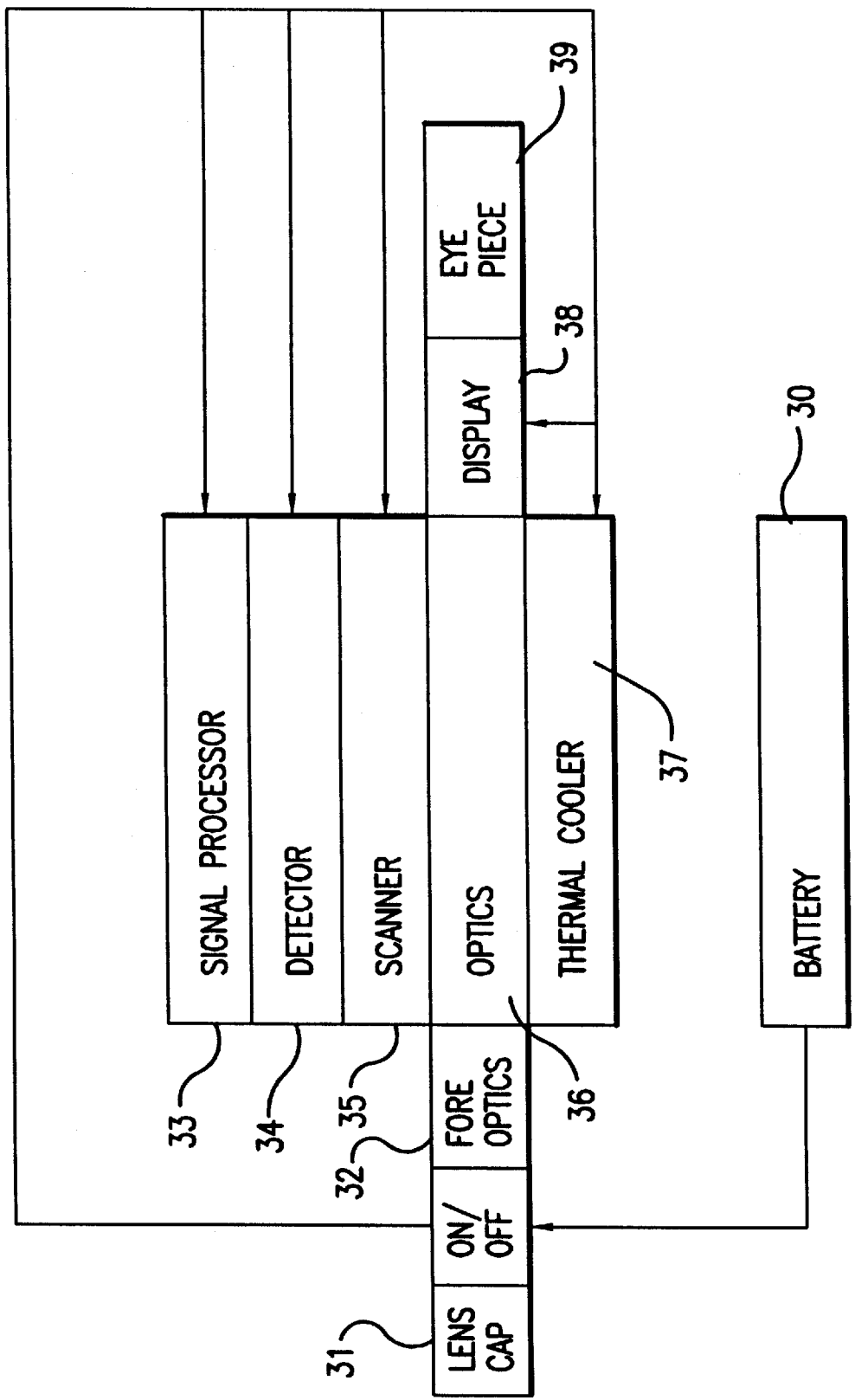
FIG. 3 is a simplified block diagram of signal pathways of the present invention utilized in the TWS.

FIG. 3 is a simplified block diagram of signal pathways of the TWS utilizing the present invention. The operator removes the lens cap 31 and as indicated in the figure the act of doing this applies electrical power to every component of TWS that needs power, i.e., the signal processor 33, the detector 34, the scanner 35 and the thermal cooler 37 all obtain power from battery 30. Note that removing the lens cap does not alter the brightness control (part of display component 38) and for this reason the brightness control has the value it had the last time the TWS system was used and this is a good first estimate for a brightness control setting. In use the operator looks through eye-piece 39 at the display 38 and if necessary suitably adjusts focus controls on fore-optics 32 of optics 36 to bring the subject in focus and if necessary makes further contrast and brightness adjustments on the display 38. The operator then searches for a target, supplies appropriate mechanical force to bring the cross hairs on the target and fires the weapon.

While this invention has been described in terms of preferred embodiment consisting of utilization on a TWS, those skilled in the art will recognize that the invention can be practiced with modifications with the spirit and scope of the appended claims.

Having thus described my invention, what we claim as new and desire to secure by Letters Patent is as follows:

1. A protection system for a set adjustable brightness control level regardless of previous deactivation of system display component in a thermal weapon sight (TWS) when a lens cap is utilized for covering a fore-optic of the TWS comprising:

a system display component within the TWS for producing a visual display of a thermal image scene at an adjustable brightness control level;

a power source within the TWS for producing power to the system display component;

a telescope assembly removably coupled to the TWS for at least assisting in the viewing of the thermal image scene;

a lens cap, removably coupled to said telescope assembly, for providing physical protection to the fore-optic of said telescope assembly; and a micro-switch actuator, coupled to said telescope assembly, for providing activation of said power source, such that when said lens cap is not covering the fore-optic, said micro-switch actuator is not closed, and power is provided to the system display component at a set adjustable brightness control level, and when said lens cap is covering the fore-optic, said micro-switch actuator is closed thereby effecting no power to the system display component of the TWS, whereby when the lens cap is again not covering the fore-optic, said display component continues to produce said set adjustable brightness control level.

2. A protection technique for a set adjustable brightness control level regardless of previous deactivation of system display component in a thermal weapon sight (TWS) when a lens cap is utilized for covering a fore-optic of the TWS comprising the steps of:

providing a visual display of a thermal image scene at an adjustable brightness control level;

providing a power source for producing power to the system display component;

providing a telescope assembly removably coupled to the TWS for at least assisting in the viewing of the thermal image scene;

providing a lens cap, removably coupled to said telescope assembly for providing physical protection to the fore-optic of said telescope assembly; and providing a micro-switch actuator, coupled to said telescope assembly, such that when said lens cap is not covering the fore-optic, the micro-switch actuator is not closed, and power is provided to the system display component at a set adjustable brightness control level, and when said lens cap is covering the fore-optic, the micro-switch actuator is closed thereby effecting no power to the system display component of the TWS, whereby when the lens cap is again not covering the fore-optic, said display component continues to produce said set adjustable

* * * * *